Nov. 22, 1966  M. L. HEINZ  3,287,672
DISC-LOADED WAVEGUIDE TUNING MACHINE WHICH AUTOMATICALLY TUNES
SUCCESSIVE CAVITIES BY INDENTING WAVEGUIDE WALL
Filed Nov. 19, 1964  5 Sheets-Sheet 2

INVENTOR.
MARVIN L. HEINZ
BY
ATTORNEY

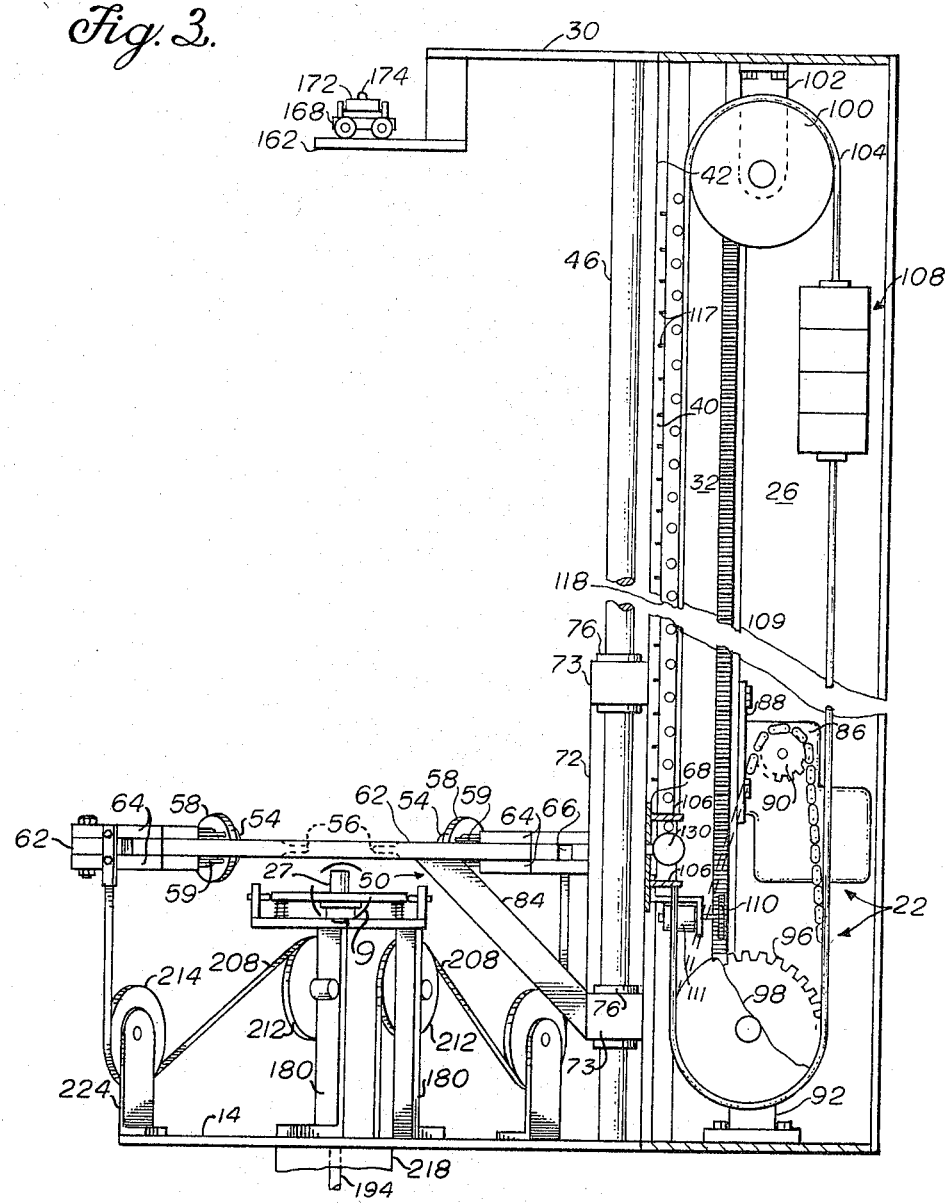

Nov. 22, 1966  M. L. HEINZ  3,287,672
DISC-LOADED WAVEGUIDE TUNING MACHINE WHICH AUTOMATICALLY TUNES
SUCCESSIVE CAVITIES BY INDENTING WAVEGUIDE WALL
Filed Nov. 19, 1964  5 Sheets-Sheet 4
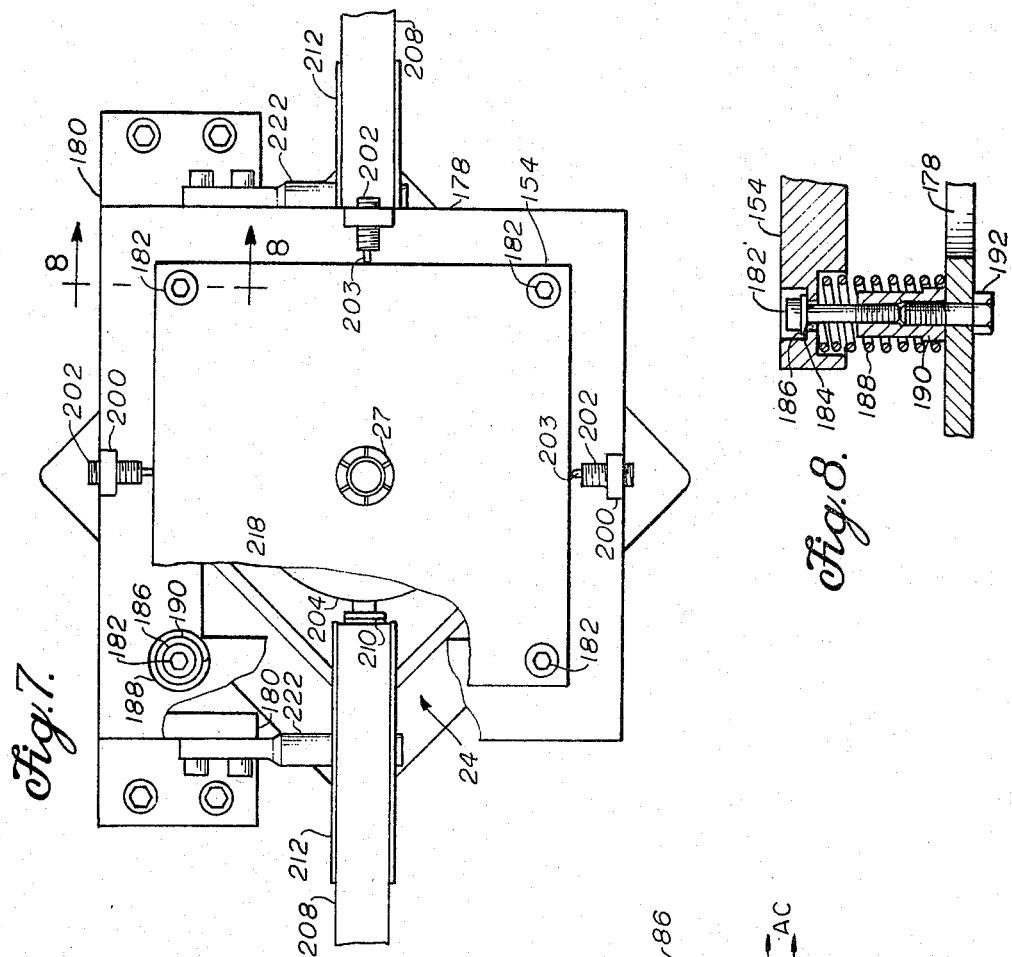
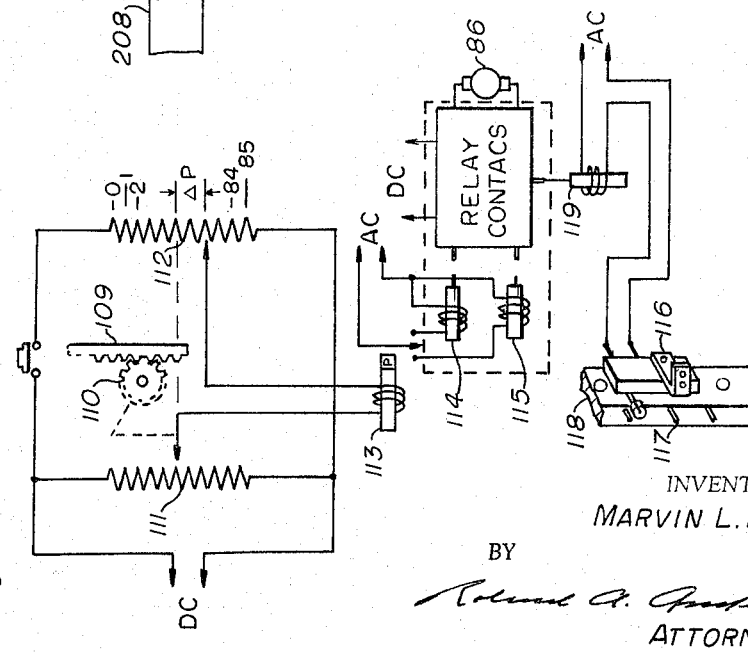
INVENTOR.
MARVIN L. HEINZ
BY
ATTORNEY

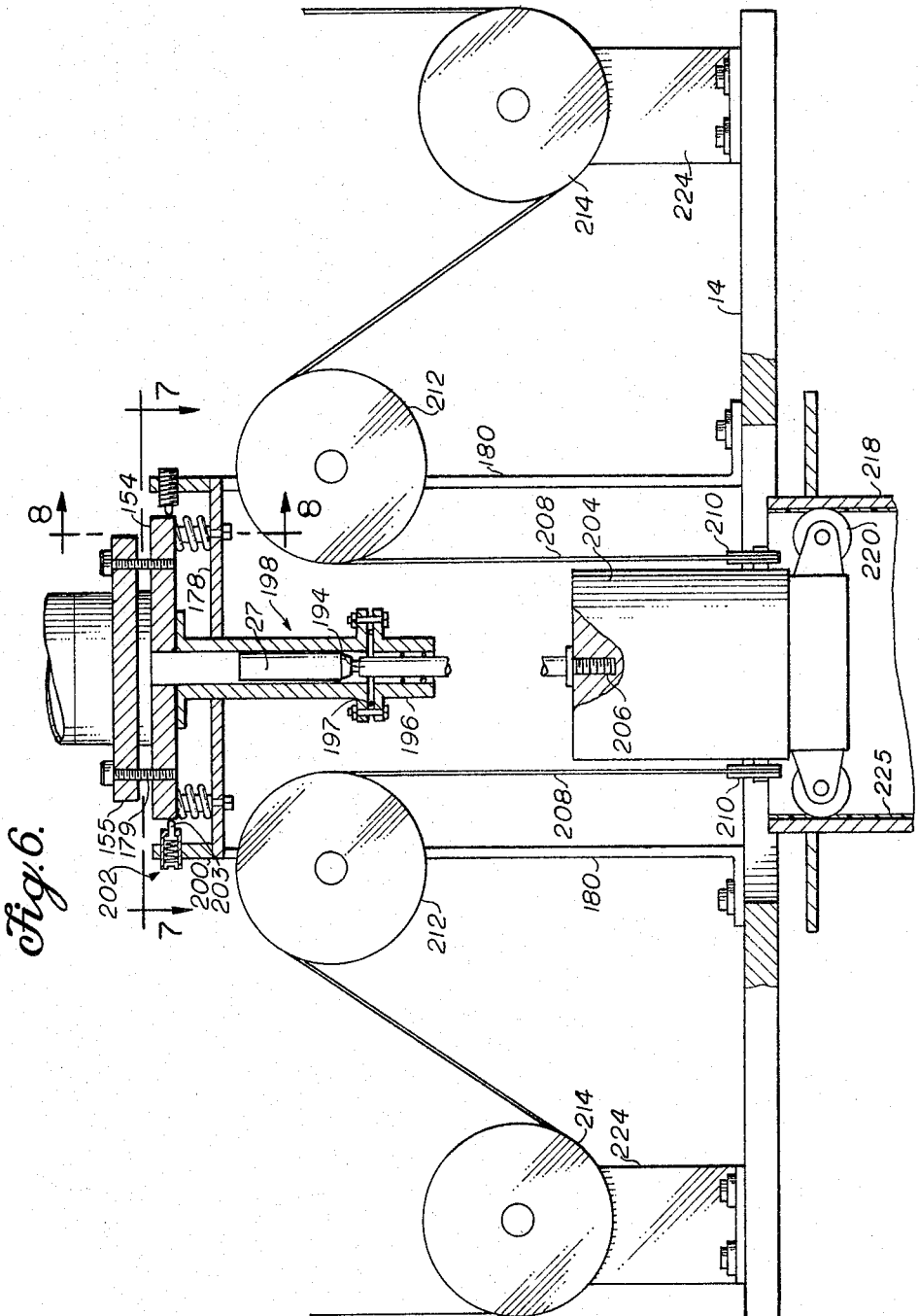

United States Patent Office 3,287,672
Patented Nov. 22, 1966

3,287,672
DISC-LOADED WAVEGUIDE TUNING MACHINE WHICH AUTOMATICALLY TUNES SUCCESSIVE CAVITIES BY INDENTING WAVEGUIDE WALL
Marvin L. Heinz, Mountain View, Calif., assignor to the United States of America, as represented by the United States Atomic Energy Commission
Filed Nov. 19, 1964, Ser. No. 412,573
12 Claims. (Cl. 333—83)

The invention disclosed herein was made under, or in, the course of Contract No. AT(04–3)–400 with the United States Atomic Energy Commission.

The present invention relates to radio-frequency devices for tuning resonant cavities, and more particularly, to an automatic high-speed cavity indenting apparatus capable of performing a very large number of tuning operations with optimum tuning consistency and speed.

There are various known methods and devices for tuning disc-loaded waveguide cavities to desired microwave power transmissision frequencies and phase, wherein the devices adjust the cavity dimensions to allow same to transmit effectively the preselected power introduced thereto. Such present devices are generally simple in structure and rather straightforward in use, such as for example, in the case of a manual tuning device utilizing basically a two-screw C-clamp. Use of such a clamp, in conjunction with a wooden block to prevent any distortion of the waveguide, can provide suitable indentation of a waveguide cavity wall to sufficiently change the dimensions, to obtain the desired resonance frequency thereof. However, such a method is cumbersome and somewhat inconsistent in the results produced. Obviously, consistency of results is to be desired in tuning waveguide cavities. Furthermore, in certain applications wherein there are a large number of tuning operations to be performed, with multiple cavities, speed as well as consistency of tuning is essential.

The present invention overcomes the above-noted shortcomings of inconsistency and slowness of operation experienced by prior art tuning devices by providing a relatively accurate, efficient and reliable apparatus, capable of carefully handling and tuning in rapid, automatic sequence the plurality of cavities in a fragile disc-loaded waveguide section, while maintaining the cavities under their usual operation conditions of temperature and vacuum.

Accordingly, it is an object of the present invention to provide apparatus for accurately tuning waveguide cavities with consistency and relatively high speed.

It is another object of the present invention to provide a radio-frequency cavity tuning apparatus capable of carefully handling and tuning the multiplicity of cavities in a relatively fragile linear accelerator waveguide section without bending or otherwise distorting the waveguide section.

Yet another object of the present invention is to provide a radio-frequency cavity tuning apparatus capable of tuning cavities under operating conditions of vacuum, temperature, etc.

Other objects and advantages will be apparent in the following description and claims considered together with the accompanying drawings, in which FIGURE 1 is a perspective, partially exploded, view of a cavity tuning apparatus exemplifying the construction taught by the present invention;

FIGURE 3 is a cross-section view taken along line 3—3 of FIGURE 2, but showing in addition the entire height of the apparatus;

FIGURE 4 is a schematic diagram of a simplified electrical circuit exemplifying the control circuit utilized in the carriage positioning means of the aforesaid apparatus;

FIGURE 5 is an enlarged, perspective view of a portion of the apparatus shown within section 4 of FIGURE 1;

FIGURE 6 is an enlarged, cross-section view of the shorting plunger drive means of the present invention;

FIGURE 7 is a cross-section view taken along line 7—7 of FIGURE 6;

FIGURE 8 is a cross-section view taken along line 8—8 of FIGURES 6 and 7;

Figure 1:
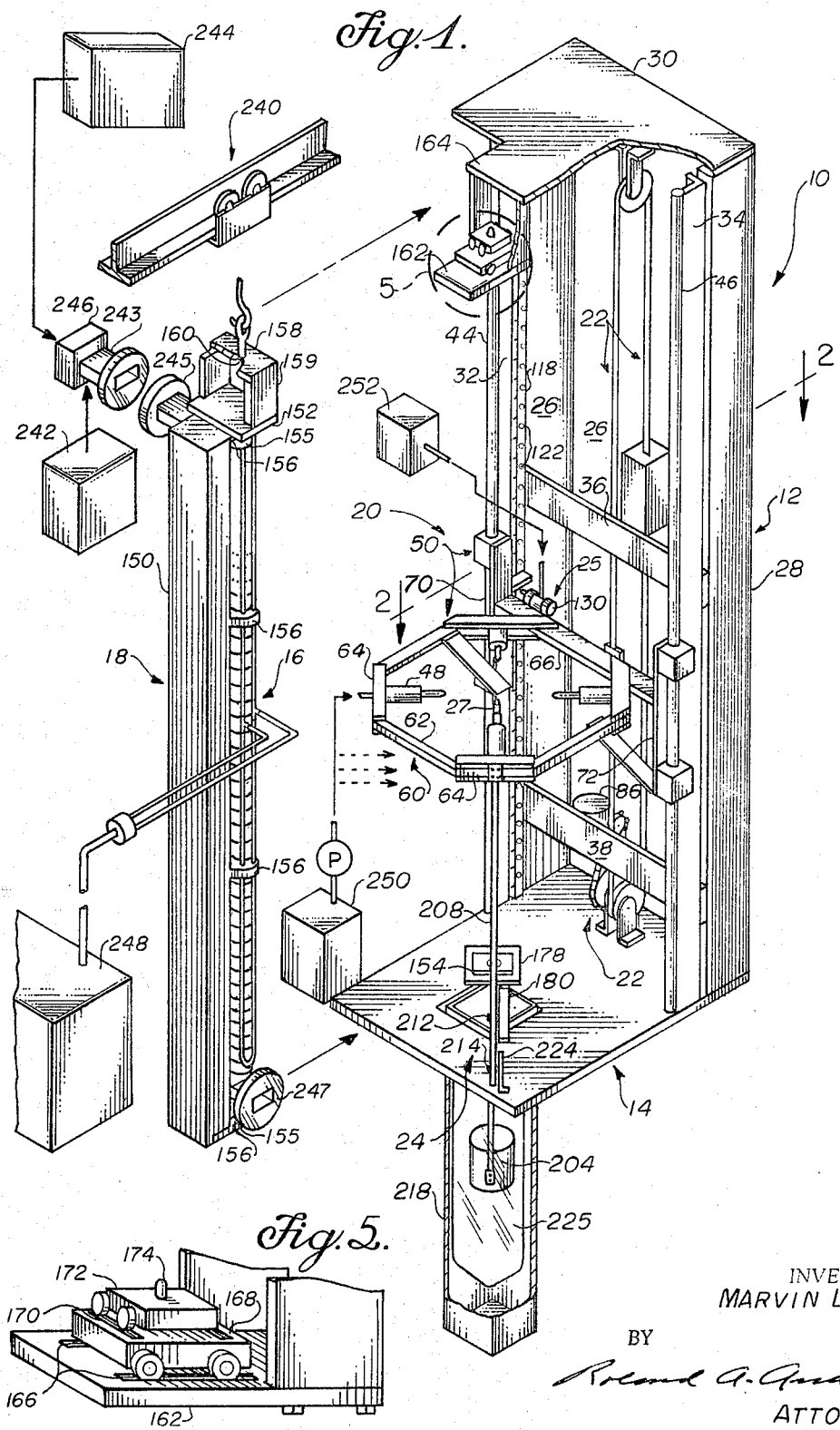

Briefly, referring to FIGURE 1 there is shown a cavity tuning apparatus 10 exemplifying the mechanism of the invention, but as herein described, particularly designed for tuning a ten-foot disc-loaded waveguide section of linear accelerator. A frame support means 12 comprising the main support structure of the device is a rigid attachment to a floor base plate 14. A waveguide section 16, formed of a tubular member having a number of spaced interval partition members providing a multiplicity of cavities which are to be tuned (viz, 86 in the present case), is held secured to a waveguide section support means 18 which is in turn demountably secured to the frame support means 12. The various cavities of the waveguide section 16 are successively, or selectively, indented and thus tuned by a vertically translatable, and positionable indenting assembly 20, including a carriage 50 appropriately mounted to the frame support means 12. An indenting carriage drive means 22 comprising basically a motor, and a cable and pulley system extending the length of the frame support means 12 and secured at one point therealong to the indenting means 20, provides the motivation for vertically translating the indenting assembly 20 with respect to the frame support 12 and the supported waveguide section 16. A shorting plunger drive means 24, including a shorting plunger 27 and a rod secured thereto, extends axially upward into the section 16 and is positively coupled to the indenting assembly 20 in such manner whereby vertical translation of the assembly 20 with respect to the section 16 causes an exact vertical translation of the shorting plunger 27 within the section. A positioning means 25 including an electrical control circuit is utilized to position and lock the indenting means 20 with respect to the waveguide section 16, whereby exact positioning of the means go with respect to the cavity to be tuned is effected.

Figure 2:
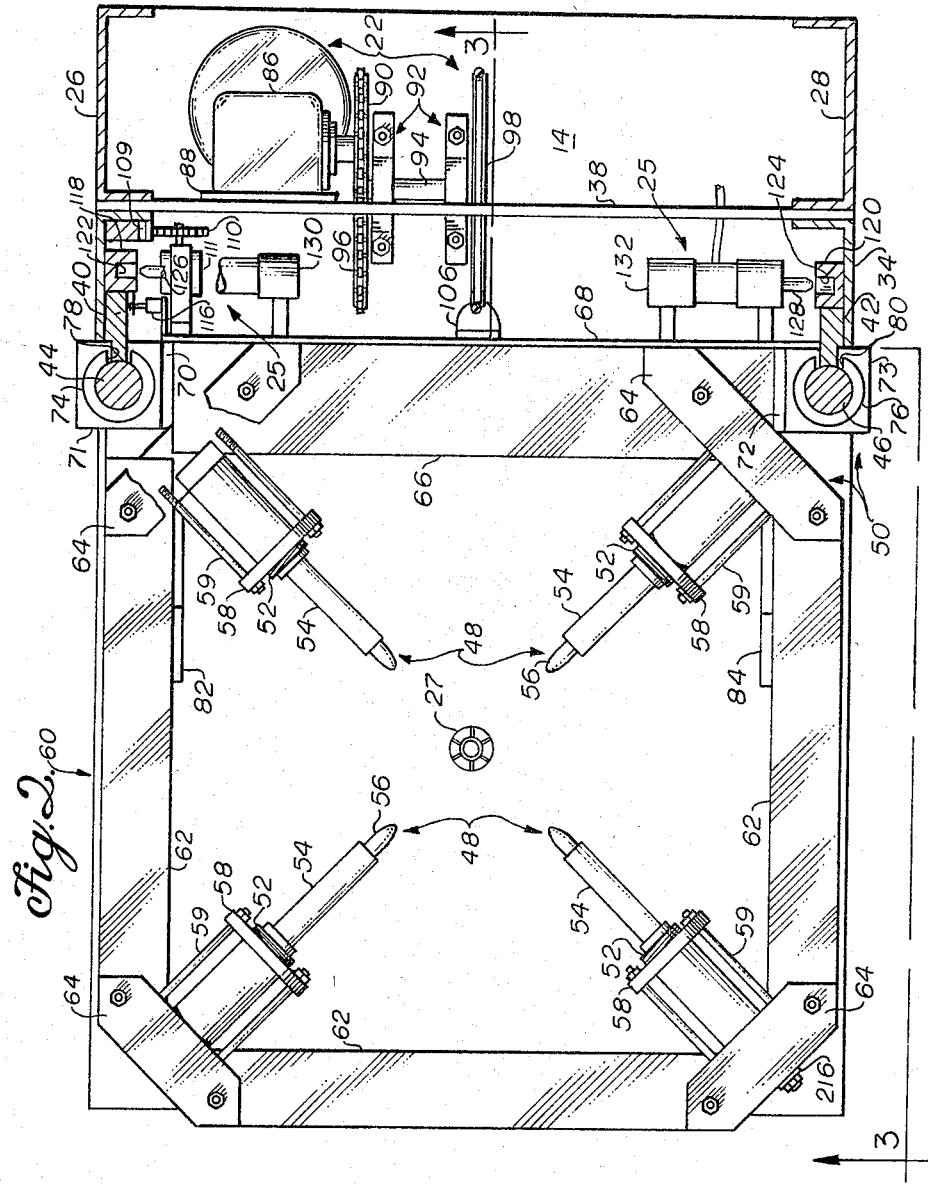
FIGURE 2 is a cross-section view taken along line 2—2 of FIGURE 1 showing in further detail the actual construction of an embodiment of the tuning apparatus.

Referring additionally to FIGURES 2 and 3, the construction of the tuning apparatus 10 exemplifying the concept of the present invention is shown in greater detail. More particularly, the frame support means 12 is conveniently constructed utilizing two generally U-shaped channel beams 26 and 28, secured at one end thereof to adjacent corners of the base plate 14 by suitable means such as bolts or by welding. The beams 26, 28 rise vertically upward from base plate 14 to be secured at their upper ends to adjacent corners of an upper plate 30. The length of the beams 26 and 28 are chosen to exceed by a substantial length the length of the waveguide section 16 to be tuned to allow sufficient vertical movement of the indenting assembly 20 along the entire length of section 16. Additional L-shaped beams 32 and 34, having lengths substantially equal to the lengths of beams 26, 28, are likewise rigidly secured between plates 14 and 30 with the flanged portion of the beams 32, 34 disposed against, and secured by means of bolts to, a flanged portion of the beams 26, 28 respectively along the length thereof. Flat steel plates 36 and 38, having a length substantially equal to the width of the base plate 14, are secured at either end between the joined flanges of beams 32, 26 and beams 34, 28, and extend therebetween to provide structural rigidity to the frame support means 12, as well as to provide a base upon which other operating mechanism of the tuning apparatus 10 is mounted as described infra. Vertical guide means are provided using bars 40 and 42, having lengths slightly shorter than the L-shaped beams 32, 34 are rigidly secured respectively thereto along the entire length of one edge preferably by means of bolts. The opposite edge of bars 40, 42 coextensive in length are in turn rigidly secured to cylindrical slide rods 44 and 46 respectively, preferably by bolting the rods to the bars along the entire lengths thereof. It is to be understood that the bars 40, 42 could be dispensed with entirely and the edges of the L-shaped beams 32, 34 could be rigidly secured directly to the cylindrical rods 44, 46 respectively along the entire lengths thereof, in the manner heretofore described.

Consider now in detail the preferred structure of the indenting means assembly 20 of previous invention. Same comprises, in essence, the combination of an evenly radially distributed series of horizontally-oriented hydraulic indenting rams 48 secured to a vertically translatable carriage 50, whereby vertical translation of the carriage 50 imparts vertical translation to the integrally secured, radially spaced, hydraulic rams 48. The hydraulic rams 48 each comprise the combination of a hollow, hydraulic-fluid cylinder 52, telescoping plungers 54 slideably disposed in sealed coaxial relation within the cylinder 52, and an indenting tip 56 of convex-contoured end surface, which is coaxially secured to the end of the plungers 54. The hydraulic rams 48 are mounted to the inside corner portions of carriage frame 50 by means of a collar 58, threadably disposed circumjacent a threaded portion of the cylinder 52, and a plurality of bolts 59 which pass at spaced intervals through the collar 58 and screw into threaded bores within the carriage 50 structure.

The carriage 50 more particularly comprises an alternately arranged series of single and double bars bolted together to form a generally rectangular ram support frame 60. Although frame 60 is herein shown as a series of single bars 62 disposed to form the sides thereof with double bars 64 disposed diagonally at adjacent ends of the bars 62 joining same rigidly together, it is to be understood that any arrangement of bars or a single set of four bars welded together in end-to-end, perpendicular relation could be utilized in place of the particular arrangement of bars described herein as frame 60. However, double bars 64 provide a more stable means at each corner of the rectangular frame 60 for mounting thereto the hydraulic rams 48. The hydraulic rams 48 are each circumferentially arranged within a horizontal plane at spaced 90° intervals from each other, along the diagonals of said frame 60 to provide two pairs of plungers disposed in oppositely spaced relation along two, perpendicular, diameters of the supported waveguide section 16. Frame support bar 66, which forms one side of the rectangular frame 60, is of relatively increased width to provide greater support rigidty for the frame and in addition has a flat back plate 68 integrally secured along the back edge thereof. Frame support plates 70 and 72 are secured at substantially the midportions thereof in perpendicular relation to the ends of the bar 66, plate 68, and extend in parallel relation, within and along the vertically extending cylindrical slide rods 44 and 46. At the ends of each of the frame support plates 70, 72 there are secured bearing holders 71, 73 respectively wherein are disposed a pair of recirculating ball bearings 74 and 76 respectively. The holders 71, 73 and bearings 74, 76, are slotted to fit in slideable relation about cylindrical slide rods 44, 46 respectively; i.e., slotted portions of the holders 71, 73 are removed to provide channels 78, 80 respectively therein, (FIGURE 2) to allow passage of the steel bars 40, 42. Further rigidity is provided between rectangular frame 60 and the ball bearings 74, 76 by means of diagonally extending braces 82 and 84 rigidly secured between bars 62 and vertically disposed frame support plates 70, 72 respectively.

Consider now in detail the preferred structure of the indenting assembly drive means 22 of previous mention. A suitably geared, direct current drive motor 86 is securely mounted to the flat plate 38 by means of a motor base plate 88, wherein the shaft of the motor extends parallel with the flat plate 38 and is terminated with a drive sprocket 90 secured coaxially thereto. A lower pulley support bracket 92 is rigidly secured to the base plate 14, which is adapted at the upper end thereof to receive a shaft which extends transversely therethrough, which in turn has a sprocket 96 and a lower grooved pulley 98 coaxially secured at opposite ends thereof. An upper grooved pulley 100 (FIGURE 3) is rotatably secured to the upper plate 30 by an upper pulley support bracket 102. A carriage drive cable 104 of suitable diameter is passed about the circumferences of both grooved pulleys 98 and 100 and is attached at the ends thereof to a projection bracket 106 rigidly secured to the flat back plate 68. Both pulleys 98 and 100 are disposed along a plane which perpendicularly bisects the flat plates 36, 38, and are preferably positioned such that the portion of the cable 104 which extends between the front edges of the pulleys lies along a straight vertical line extending through projection bracket 106. A counterweight 108 suitably formed of for example, lead weights, is secured to the cable 104 to provide weight for counter-balancing the indenting assembly 20 and thus provide for smoother functioning of the indenting assembly means 20.

Consider now the carriage positioning means 25 of previous mention as shown in FIGURES 2, 3 and 4. Same comprises the combination of an initial position control means for selecting and approximately positioning the indenting assembly means 20 in relation to a preselected cavity, and a precise position control and lock means for precisely positioning the assembly 20 with respect to the cavity.

The initial carriage position control means comprises a rack 109 integrally secured vertically along the flanged edge of L-shaped beam 32. The teeth of the rack 109 mesh with the teeth of a pinion gear 110, which is in turn secured to a shaft coupled to the slider contract of a potentiometer 111, herein termed a "slave" potentiometer. An additional potentiometer 112, herein termed a "control" potentiometer, is connected in electrical parallel with the slave potentiometer 111 and the two potentiometers are connected to a source of direct current (not shown). The slider of control potentiometer 112 is connected to the slider of slave potentiometer 111 via the coil of a sensitive polarized relay 113, for example a micropositioner. Polarized relay 113 has a set of single-pole, double-throw contacts, and when not energized remains unclosed, or in the normally open position between the contacts. One contact thereof is connected in series with a clockwise relay 114, and a second contact thereof is connected in series with a counterclockwise relay 115. The contacts of either of relays 114 and 115, in turn, connect the drive motor 86 to a source of direct current of the desired polarity. A microswitch 116 is secured by means of a bracket to the back plate 68 and positioned such that the contacts thereof are periodically actuated by a spaced plurality of pins 117 which protrude rigidly from a bar 118 further described infra. The microswitch 116 contacts are serially connected with a suitable alternating current power source (not shown) and a relay 119, the contacts of the latter being connected in shunt with the contacts of the clockwise and counterclockwise relays 114, 115 respectively.

Thus it may be seen that the initial carriage position control means monitors the initial positioning of the indenting assembly 20 with respect to the waveguide section 16 to be tuned. The slider of the control potentiometer 112 is coupled to a manually operable dial which is graduated in equal increments numbering from zero to at least 85. The 10 foot waveguide section 16 is formed of a succession of 86 cavities; thus each of the 86 numerals of the dial from 0 to 85 corresponds to a particular cavity of the section 16, thereby allowing preselection of any of the cavities. The selection of a particular numeral on the dial predetermines the position of the assembly 20 with the desired waveguide section 16 position, i.e., determines the position of the indenting rams 48 with respect to the center of a single cavity of the 86 cavities. The slave potentiometer 111, which is rotated by movement of the pinion gear 110 along the rack 119, due in turn to vertical translation of the indenting carriage means 20, produces a resultant voltage between the sliders of the two potentiometers which is detectable as a potential unbalance $\Delta p$ by means of the sensitive polarized relay 113. The polarized relay 113 responds to small imbalances in voltage and is adapted to govern the direction of movement of the indenting assembly 20 by energizing the relay 113 to close one of the contacts thereof, depending upon the polarity of the voltage unbalance detected. Closure of the contacts in turn energizes either the clockwise or counterclockwise relay 114, 115 respectively, which will operate the drive motor 86 forward or backward respectively. The assembly 20 is moved upward or downward as determined by the polarity of the voltage unbalance sensed by the relay 113, simultaneously driving the slider of slave potentiometer 111 to a position where the potential unbalance $\Delta p$ approaches to within ¼ cavity of the exact cavity center, i.e., zero voltage unbalance. At such time relay 113 is de-energized for lack of a potential unbalance between the potentiometers 111 and 112. The motor 86 remains energized until the microswitch 116 is actuated, 1/16 inch from the center of the predetermined cavity, by means of one of the spaced plurality of pins 117, thereby stopping the indenting assembly means 20 at the cavity preselected on the graduated dial of potentiometer 112. The microswitch 116 is activated each time it passes one of the pins 117, but has no control of drive motor 86, until the desired cavity is approached by the assembly means 20. At such time as the pin 117 corresponding to the cavity activates the microswitch 116, the latter closes a circuit which activates the relay 119, which in turn shunts across the polarized relay 113 contacts, and the microswitch 116 assumes control of the drive motor 86. Thus, the indenting assembly 20 and the integral indenting hydraulic rams 48 can be stopped to within at least 1/16 inch of the center of a preselected cavity of the 86 cavities in the waveguide section 16.

The initial carriage position control means indexes the indenting assembly 20 to within 1/16 inch of the exact center of the cavity to be tuned. However, precise positioning of the indenting hydraulic rams 48, as well as the locking in position thereof, is accomplished by the precise position control and lock means which, inter alia, comprises two carriage indexing bars 118 and 120, rigidly secured respectively to the inside surface of the L-shaped beams 32, 34 along substantially the entire length thereof between the base plate 14 and upper plate 30. The bars 118, 120 have a multiplicity of index holes 122 and 124 respectively, drilled therein along the length thereof, the distance between the holes being equal to the exact distance between the centers of the cavities forming the waveguide section 16. The bars 118, 120 and thus the holes 122, 124 therein are positioned on frame support means 12 such that actuation of plungers 126, 128 of respective lock air cylinders 130, 132, aligns with a high degree of accuracy the indexing assembly 20, and thus the indenting cylinders 48 with respect to the center of the cavity to be tuned. As may be seen, the air cylinders 130, 132 are rigidly secured to the flat back plate 68 at either end thereof, and are positioned such that the operable plungers 126, 128 thereof face towards the index holes 122, 124 of the carriage indexing bars 118, 120 respectively. The diameters of plungers 126, 128 are only slightly smaller than that of holes 122, 124 and fit snuggly therein. The tips of plungers 126, 128 are tappered approximately ⅛ inch whereby any misalignment of the plungers with respect to the holes due to any carriage misalignment by the initial carriage position control means, is compensated for since the plunger 126, 128 upon being driven into holes 122, 124, respectively, will force the exact alignment of indenting assembly 20.

Consider now in greater detail the waveguide section support means 18 as shown in FIGURES 1, 5–8. A rigid hollow beam 150 extends along the length of the waveguide sections 16 to provide stiffness thereto, not only while handling the sections but also after the sections are assembled to form the accelerator. The waveguide section 16 is secured to the beam 150 by means of demountable support straps 156 spaced along the length thereof and rigidly secured between the facing surface of the beam 150 and about the waveguide section 16. A casting 155 is disposed about each end of the section 16, and each, in turn, is secured to the adjacent ends of the beam 150 by respective support straps 156. An upper waveguide seal plate 152 is rigidly secured in perpendicular relation to the upper end of the waveguide section 16 by bolting it to the upper casting 155, and a lower waveguide seal plate 154 is provided at the bottom end of the waveguide section 16, and is secured thereto upon assembly of the section 16 within the tuning device 10. Vacuum sealing means such as satisfactorily afforded by an "O-ring" is provided between the abutting surfaces of either end of the waveguide section 16 and the facing surfaces of the respective seal plates 152, 154. A hole is provided in the lower seal plate 154, in coaxial alignment with the holes of the waveguide cavities of section 16, to provide a passageway in plate 154 for introducing therethrough the shorting plunger 27. It is to be understood that beam 150 is not essential in the actual tuning operation of the waveguide section 16, and can in fact be dispensed with; the section 16 is sufficiently supported for tuning by means of the seal plates 152 and 154, secured to respective castings 155.

A hanger plate 158 is secured parallel to the upper seal plate 152 in generally coaxial alignment therewith by means of hanger bars 159. A cone-shaped depression 160 is formed in the undersurface of the hanger plate 158 in exact coaxial alignment with the axis of the waveguide section 16, thus being positioned directly in register with the cavity passageway. An L-shaped bracket 162 is rigidly secured to an extended central portion 164 of the upper plate 30 as shown in FIGURE 1, providing an extended horizontal shelf upon which the hanger plate 158 can be hung.

Referring particularly to FIGURE 5, shallow grooves 166 are formed in the upper surface of the horizontally extending portion of L-shaped bracket 162 in parallel relation to the front of the tuning device 10. A four-wheeled truck 168, formed of a steel block and 4 wheels rotatably secured thereto, is disposed upon the horizontal portion of bracket 162 with the wheels thereof in the grooves 166. The upper surface of the truck 168 has parallel shallow grooves 170 formed therein in perpendicular relation to the grooves 166. A second smaller, four-wheeled truck 172 is disposed upon truck 168 with the wheels of truck 172 within the grooves 170. A steel ball 174 is welded to the center of the upper surface of truck 172. The waveguide setcion 16 is assembled within the frame support means 12 by hanging the hanger plate 158 upon the L-bracket 162, and particularly, by placing the conical depression 160 in mating relation upon the steel ball 174 of truck 172. Thus the waveguide section 16 is hung within the indenting assembly 20 and within the tips of the indenting cylinders 48. Furthermore, the waveguide section 16 is not rigidly secured within the tuning device 10 but is instead allowed movement in any horizontal direction by means of the two-truck suspension system, whereby any horizontally applied, excessively unbalanced force placed against the waveguide section 16 will impart sufficient movement to the waveguide section to allow equillibrium to be reached. Thus, excessive horizontal strain upon the fragile waveguide section 16 due to uneven loading thereof is prevented. To prevent cumulative horizontal movement of waveguide section 16 in one direction, each of the trucks 168 and 172 are returned to, and held in, a coaxially centered position by conventional spring centering devices (not shown) after each tuning operation.

Referring particularly to FIGURES 6–8, the bottom end of the waveguide section 16 is sealed against the upper surface of the seal plate 154 by disposing therebetween a seal gasket such as an "O-ring" 177, and bolting the two surfaces together by passing threaded bolts 179 through lower casting 155 and tightening them into threaded holes in the plate 154. The seal plate 154 is coupled in spring-loaded relation to a support plate 178, which is in turn, secured to the surface of the base plate 14 by suitable braces 180. More particularly, the spring-supported seal plate 154 is mounted, preferably at the four corners thereof, by inserting bolts 182 through holes 184 therein. The holes 184 are purposely drilled with an excessively large diameter to allow a slight freedom of movement of bolts 182 therein in any horizontal direction. Thus, washers 186, which also have excessive play with respect to holes 184, are utilized between the bolts 182 and plate 154 to prevent the bolts from passing through the holes 184. Excessive play is allowed in the mounting of bolts 182 such that seal plate 154 may shift with respect to the bolts. Springs 188 are disposed between respective depressions formed in the underside of plate 154, and the upper surface of the support plate 178. Each spring 188 is secured to the support plate 178 by means of a spring post 190 which is threadably secured in turn to the plate 178 by a coaxial bolt 192. Bolt 182 is likewise threadedly secured to the upper end of spring post 190. Thus the spaced plurality of springs 188 allow the plate 154 to float vertically as a part of the section support means 18, and allow the plate to conform to, as well as align with, the bottom end of the waveguide section 16 upon installation thereof within the device 10.

To prevent the loss of vacuum within section 16 due to the introduction of the shorting plunger 27, a cylindrical gasket means 196 is coaxially secured to a cylindrical member 198, which is in turn, sealed to the bottom surface of the spring-loaded seal plate 154 by disposing therebetween a gasket O-ring 197 and bolting same together. Cylindrical member 198 has an axially extending passageway formed therein, with a diameter equal to the diameter of the centrally extending aperture through plate 154 and in register therewith, and provides means whereby the end of the shorting plunger 27 may be withdrawn below the surface of plate 154 when assembling the waveguide section thereto. The lower end of the cylindrical gasket means 196 is provided with a seal gasket 199 which is capable of allowing vertical translation of a plunger rod 194 of the shorting plunger 27 therethrough while preserving the vacuum within the waveguide section 16. To return the waveguide section 16 to axial center after each tuning operation a series of conventional spring centering devices are utilized coupled between the support plate 178 and the spring-loaded seal plate 154. For example, a series of brackets 200 are rigidly secured at spaced intervals along the periphery of the support plate 178. The brackets 200 are provided with threaded bores wherein is threadably disposed spring centering devices 202. The devices 202 comprise a plunger 203 having limited motion, i.e., a stop shoulder, in the direction towards the plate 154. The plunger is spring-loaded in the same direction, whereby the lower end of section 16 is allowed slight horizontal movement when unbalanced loads are placed against it, usually by the rams 48 during the tuning operation, but whereby the section is returned to center by action of the then compressed springs of the respective device or devices 202.

Consider now the shorting plunger drive means 24 of previous mention as more particularly shown on FIGURES 6 and 7. The shorting plunger 27 and rod 194, inserted through the central aperture in the spring-supported seal plate 154 and into the centrally extending passageway of the disc-loaded waveguide section 16, is utilized in the radio-frequency measurement of each of the cavities being tuned during the tuning operation. To this end, the plunger 27 must be vertically translatable within the waveguide section 16 along the axis thereof in precisely phased or adjusted relation to the vertical translation of the indenting assembly 20, and in particular, the indenting hydraulic rams 48. Therefore, means need to be provided to positively secure the assembly 20 to the shorting plunger 27 and rod 194 during the vertical translation thereof. Such means utilize a shorting plunger weight 204 having an axial, threaded bore 206 adapted to demountably receive the lower, threaded end of the shorting plunger rod 194. The weight 204 is positively secured to the assembly 20 by means of flexible, non-stretchable bands 208, demountably bolted to the sides of the weight 204 by clamps 210, wherein each band extends upwardly therefrom to pass through a spaced set of grooved pulleys 212 and 214. The upper ends of the flexible bands 208 are demountably fastened to opposite sides of the assembly 20, and in particular, to the double bars 64 of frame 60 by means of adjustable clamps 216. Thus, it may be seen that by adjusting the length of the inelastic bands 208 by means of adjustable clamps 216, very precise positioning of the upper end of the shorting plunger 27 with respect to the indenting tips 56 of the rams 48 may be obtained, and thereafter maintained upon translation of the indenting assembly means 20 along the waveguide section 16 while tuning the cavities. To provide for controllable motion of the shorting plunger 27 and in particular the rod 194 and weight 204 secured thereto, an elongated steel box 218 is secured at its upper end to the base plate 14 and depends therefrom in coaxial relation to the plunger 27 and rod 194 in register with the weight 204. The weight 204 has rollers 200 preferably made of a soft, tough, low vapor pressure, e.g., material Teflon, secured thereto at 180° spaced relation, which fit loosely within to thus bear loosely along opposing corners of the box 218. The box 218 must therefore be of sufficient length to allow the weight 204 to vertically translate a sufficient distance to move shorting plunger 27 below the level of the spring-supported seal plate 154, as well as to allow movement of assembly 20 along the entire length of the waveguide section 16. The pulleys 212 are rotatably secured to the braces 180 by an axle 222. The pulleys 214 are rotatably secured generally in vertical alignment below the width of the assembly 20, by means of braces 224 which are rigidly bolted to the base plate 14. The box 218 is lined with a plastic bag (not shown) along its entire length in order to facilitate cleaning of the box.

Figure 9:
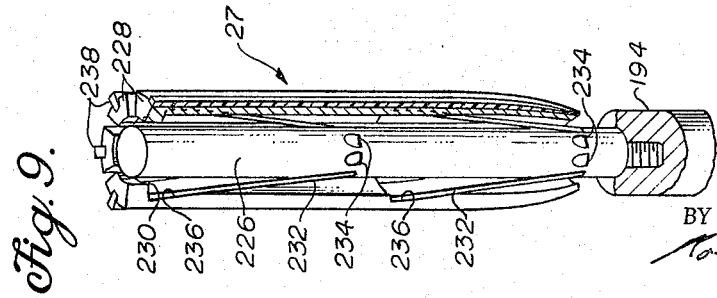
FIGURE 9 is a cross-section view taken along line 9—9 of FIGURE 3.

Referring now to FIGURE 9, the shorting plunger 27 is preferably constructed utilizing an expandable outer circumference, whereby the plunger cross section conforms to the diameters of the axial apertures of the waveguide section 16. Such configuration provides preferred radio-frequency shorting characteristics over the solid cylinder configuration which may be utilized and which is shown in FIGURES 1, 3 and 6. More particularly, a rod 226 is threadably secured coaxial to the shorting plunger rod 194. A plurality of shorting segments 228 are evenly spaced circumjacent about the rod 226. The segments 228 have a radially-inward facing flange 230 formed at their upper end, and are bent radially inward at the other end thereof. A set of flat springs 232 are secured between the rod 226 and each segment 228, preferably by forming a plurality of flat surfaces 234 about the central and lower regions of the rod 226 and two flat surfaces 236 formed at the central and upper regions of each segment 228. One of the set of springs is brazed at one end to the flat surface 236 formed at the upper region of each of the segments, and the other end of the same spring is welded to the flat surface 234 formed about the central region of the rod 226. The second of the set of flat springs 232 is brazed at its upper end to the centrally located flat surface 236 of the segment 228, and the other end is welded to a respective flat surface 234 formed about the lower region of rod 226. Thus, it may be seen that the springs 232, rod 226, and segments 228, of each spring-loaded segment assembly form, in essence, a parallelogram, wherein a radial force applied at points along the segment lengths causes substantially an even displacement of the entire segment; i.e., each segment 228 moves substantially in parallel relation to the axis of the rod 226. The segments 228 have a radially inward displacement of approximately ⅛ inch. Thus, the overall diameter of the shorting plunger 27 when completely closed is approximately ¾ inch, and when completely opened is approximately 1 inch. To prevent binding of the segments 228 when the plunger 27 is moved along the centrally extending apertures of the section 16, an axially extending Teflon strip 238 is embedded along each segment within the outer surface thereof in raised relation therewith, to provide a non-binding bearing surface fo reach segment 228. The length of plunger 27 is preferably made equal to at least one wavelength of the input signal introduced to the section 16 while tuning.

The waveguide section 16, which is secured to the beam 150 to provide stiffness to the fragile section 16 assembly, is lifted by suitable means, such as a forklift, block and tackle, etc., to a suspended position from an overhead transport system 240 comprising for example an overhead track, and a carrier trolley supported thereon. The mounted section 16 is moved into position upon the overhead transport system 240 and is hung upon the L-shaped bracket 162 and in particular, upon the truck 172. At such time as the section 16 is lowered from the carrier to rest upon the truck system, the lower end of the section 16 and in particular, the lower casting 155 is secured by means of bolts to the spring-supported seal plate 154, as shown in FIGURE 6.

Various auxiliary systems are needed to provide the inputs to the tuning device 10 as taught by the present invention. To this end, referring to FIGURE 1, a radio-frequency power supply means 242 is coupled to the upper end of the waveguide section 16 via a length of waveguide 243 and a conventional power input coupler 245 which is part of the waveguide section 16. The conventional power output coupler 247 located at the bottom end of the waveguide section 16 is preferably sealed off. Note that the power supplied to the waveguide section 16 by the radio-frequency power supply means 242 during the tuning operation is much lower than the power supplied during actual operation of the waveguide section upon assembly of the linear accelerator. A radio-frequency monitoring means 244 is coupled to the input coupler 245 of the waveguide section 16, in association with the power supply means 242 input thereto, and is utilized in conjunction with the shorting plunger 27 in measuring the reflected radio-frequency signal generated within the individual cavities of the waveguide section 16 during the tuning operation thereof. To this end, a power divider 246 is inserted in the waveguide 243 to extract the reflected signal from waveguide section 16 and to introduce the extracted, reflected signal to the monitoring means 244. The monitoring means 244 may be one of variously known phase detecting circuits, capable of comparing the phase of an incoming signal with the phase of a standard pre-set signal, i.e., a reference phase.

In order to simulate the operating characteristics of the waveguide section under normal operating conditions when assembled as a linear accelerator, a waveguide temperature control means 248, such as the type utilized in cooling a linear accelerator, is coupled to the conventional coolant coils which are brazed along the waveguide section 16. However, during the tuning operation the driving power introduced to the waveguide section is much lower than the power used in normal operation, giving rise to a proportionately lower tuning temperature than the temperature generated under normal linear accelerator operation. Thus the temperature regulating means 248 is actually utilized to increase the temperature of the waveguide section 16 rather than to decrease the temperature thereof as in normal operation.

The indenting hydraulic rams 48 operate on conventional hydraulic system theory, i.e., are provided with a hydraulic fluid pump and reservoir means 250, coupled by means of flexible hoses to the individual hydraulic rams 48 on the indenting assembly 20 via the usual hydraulic plumbing. The fluid pump and therefore the operation of the hydraulic rams 48, is controlled with the aid of a variable pressure switch (not shown) which is in turn manipulated by the operator of the device 10 in proportion to the radio-frequency measurements made by the cavity radio-frequency monitoring means 244. The hydraulic system utilizes water as the fluid in contact with the rams 48 rather than oil, as oil is somewhat undesirable due to the danger of oil seepage and contamination. A satisfactory system is to utilize oil as a fluid in creating the initial pressure, and thereafter utilizing water as a fluid within direct contact with the rams 48, whereby the pressure generated by the oil portion of the hydraulic system is transmitted to the water portion of the system.

Lock air cylinders 130, 132 are provided with an air pressure source 252 and associated valve plumbing, whereby the air cylinders may be actuated by the air pressure supply at such time as the indenting assembly 20 is initially positioned with respect to the waveguide section 16 by the initial position control means.

In operation, after the section 16 to be tuned is suspended upon the two-truck suspension system, the indenting assembly 20 is translated along the frame support means 12 to a preselected position with respect to the section 16 by setting the dial of the control potentiometer 112 on the numeral corresponding to the cavity with which the tuning operation will start. Generally, the dial is set to the "0," or to the "85" numeral, and the tuning operation thus begins at one end of the section 16, and progresses along the succession of cavities. At such time as the indenting assembly 20 approaches to within ¼ inch cavity of the desired cavity as controlled by the initial carriage position control means of previous mention, which then stops the assembly 20 to within ¹⁄₁₆ inch of the exact center of the cavity. The precise position control and lock means is then activated and the plungers 126, 128 of respective lock air cylinders 130, 132, are driven, by means of air pressure from air pressure source 252, into the holes 122, 124 of the indexing bars 118, 120 respectively. The variable pressure switch is activated which initiates operation of the hydraulic rams 48. Telescoping plungers 54 progress inwardly towards the section 16 until the indenting tips 56 thereof make contact against the outer circumference of the cavity wall whereupon indenting deformation of the wall begins. Simultaneously, signals generated by the introduction of power by the power supply means 242 are reflected from the end of the shorting plunger 27, and are monitored by the cavity radio-frequency monitoring means 244. At such time as the cavity walls are sufficiently indented to alter the cavity volume and thus the resonant frequency thereof, as monitored by the monitoring means 244, pressure on the hydraulic rams 48 is released and the telescoping plungers 54 are returned to their initial position by an internal return spring (not shown). The pressure to the lock air cylinders 130, 132 is released, the plungers 125, 128 are withdrawn from respective index holes 122, 124, and the indenting assembly means 20, and in particular, drive motor 86 is activated upon dialing the successive cavity of section 16, i.e., re-setting control potentiometer 112 to the proper corresponding numeral. The tuning procedure is thereupon repeated until the entire success of cavities is tuned to exhibit the desired frequency characteristics.

While the invention has been disclosed with respect to several embodiments, it will be apparent to those skilled in the art that numerous variations and modifications may be made within the spirit and scope of the invention and thus it is not intended to limit the invention except as defined in the following claims.

What is claimed is:

1. A high-speed apparatus for tuning radio-frequency cavities in a linear accelerator waveguide section comprising;
    (a) frame support means;
    (b) cavity indenting means secured to said frame support means in translatable relation therealong;
    (c) support and seal means demountably coupled in vacuum sealed relation between the ends of said section and said frame support means to secure in predetermined position said section relative to said plunger indenting means;
    (d) drive means mounted to said frame support means and coupled to said cavity indenting means to provide translation of said indenting means with respect to said frame support means;
    (e) position monitoring means coupled between said indenting means and said frame support means to establish and maintain the position of said indenting means relative to the succession of waveguide section cavities;
    (f) power source means coupled to said waveguide section to introduce radio-frequency driving power thereto;
    (g) and signal measuring means coupled to said waveguide section to monitor the generated signal within the cavity being tuned upon introduction of radio-frequency power from said power source means, whereby each of the cavities of said waveguide section is successively indented by said indenting means in proportion to the signal monitored by said signal measuring means.

2. A high-speed apparatus for tuning radio-frequency cavities in a linear accelerator waveguide section comprising
    (a) frame support means including a rigidly affixed base plate;
    (b) indenting assembly means slideably secured to said frame support means in translatable relation therewith, said indenting means including a radially spaced series of indenting hydraulic rams disposed to extend radially inward towards a common point;
    (c) first and second section support-and-seal means integral with said frame support means and said base plate respectively, said waveguide section being demountably secured in vacuum sealed relation between said first and second section support-and-seal means, the second section support-and-seal means having a centrally extending aperture therethrough in register with the axis of said section;
    (d) shorting plunger means having a diameter commensurate with the apertures along the axis of said section and disposed through said base plate and the aperture in said second section support-and-seal means, said shorting plunger means being positively coupled to said indenting assembly such that translation of said indenting means imparts a like translation to said shorting plunger means with a predetermined constant spacing therebetween;
    (e) drive means coupled between said indenting assembly means and said frame support means to provide translation of said assembly means with respect to said support means;
    (f) positioning means coupled between said indenting assembly means and said frame support means for indicating the position of said indenting assembly means relative to the length of said waveguide section to be tuned;
    (g) power source means coupled to said waveguide section to introduce radio-frequency power thereto;
    (h) cavity signal measuring means coupled to said waveguide section to monitor the resultant signal generated within individual cavities of said waveguide section upon introduction of radio-frequency power from said power source means, whereby each of said cavities of said waveguide section is successively indented by said indenting assembly means in proportion to the signal measured by said cavity signal measuring means.

3. A high-speed apparatus for tuning radio-frequency cavities in a linear accelerator waveguide section comprising
    (a) vertically extending frame support means including an integral base plate and vertically extending side members rigidly affixed thereto;
    (b) indenting assembly means including a carriage secured in slideable relation to said vertical side members, said indenting assembly means including a hydraulic pressure source, and frame extending substantially perpendicularly with respect to said side members, said frame having secured thereto in inwardly extending relation a radially spaced plurality of indenting hydraulic rams;
    (c) section support-and-seal means disposed between the ends of said section and said frame support means to demountably secure in sealed relation said waveguide section of said frame support means within the region encompassed by said frame;
    (d) cavity shorting means including a shorting plunger and rod extending into and along the axis of said section, said shorting means being positively coupled to said indenting assembly means wherein vertical translation of said indenting assembly means with respect to the waveguide section causes vertical translation of said shorting means with predetermined and constant vertical spacing between said indenting assembly means and said shorting means;
    (e) carriage drive means mounted to said frame support means and coupled to said indenting assembly means to provide vertical translation of said assembly means with respect to said frame support means;
    (f) positioning means coupled between said indenting assembly means and said frame support means and including an indexing bar having a plurality of holes spaced therealong secured to said frame support means, said positioning means to establish and maintain the position of said indenting assembly means along the waveguide section to be tuned;
    (g) power source means coupled to said waveguide section to introduce radio-frequency driving power thereto;
    (h) cavity radio-frequency signal measuring means coupled to said waveguide section and adapted to monitor the resultant signal generated within individual cavities of said waveguide section as established by said shorting means upon introduction of radio-frequency power from said power source means, whereby each of said cavities of said waveguide section is successively indented by said indenting assembly means in proportion to the signal monitored by said cavity signal measuring means.

4. A high-speed cavity tuning apparatus in accordance with claim 3 wherein said frame support means includes a pair of vertically extending cylindrical rods rigidly secured to said side members; a plurality of bearings secured to said indenting frame and disposed in slideable relation about said cylindrical rods to support said indenting frame in perpendicular relation to said side members in vertically translatable relation thereto along the entire length thereof; and said indenting hydraulic rams are secured to said indenting frame horizontally therein and in spatially opposing pairs, each pair lying substantially along a diameter of the waveguide section mounted therein.

5. A high-speed cavity tuning apparatus in accordance with claim 3 wherein said cavity shorting means further comprises a cavity shorting plunger secured to the end of an elongated rod, and said means positively coupling said shorting plunger to said carriage further comprises a weighted member secured to the lower end of said elongated rod, at least one flexible non-stretchable band coupled at one end to said weighted member and extending upwardly therefrom to secure at the opposite end to said indenting assembly means, a series of spaced pulleys secured to said base plate and adapted to receive and route said band, wherein the lengths of the band and the rod are chosen to locate the top of said shorting plunger one cavity width below the level of the indenting tips of said indenting hydraulic rams.

6. A high-speed cavity tuning apparatus in accordance with claim 3 wherein said assembly drive means further comprises a grooved pulley rotatively secured to the upper plate of said frame support means, a grooved pulley rotatively secured to said base plate, a cable disposed about said supper pulley and said lower pulley and secured at both ends to said indenting assembly means to define an endless cable, and electrical motor means secured to said frame support means and coupled to one of said grooved pulleys to drive said pulley and endless cable and vertically translate said indenting assembly means.

7. A high-speed cavity tuning apparatus in accordance with claim 3 wherein said cavity radio-frequency signal measuring means further includes a phase detecting circuit have a preselected standard signal, and a directional coupler disposed in-line between said power source means and said waveguide section, and coupled to said phase detecting circuit, said directional coupler being adapted to extract and introduce to said phase detecting circuit the signal reflected by said shorting plunger within said waveguide section.

8. A high-speed cavity tuning apparatus in accordance with claim 3 with said shorting plunger comprising a central rod, a plurality of longitudinal segments disposed about said rod spring means interconnecting said segments to said rod to urge said segments radially outward upon insertion of said shorting plunger within said waveguide section.

9. A high-speed cavity tuning apparatus in accordance with claim 3 wherein said section support-and-seal means further comprises,
(a) an upper seal plate demountably secured to the upper end of said section in vacuum-tight relation therewith;
(b) horizontally movable section suspension means secured to the upper end of said frame support means and to said upper seal plate, said section depending from said section suspension means;
(c) horizontally movable support means including a lower seal plate secured to said base plate and adapted to demountably receive and support in vacuum-tight relation the lower end of said section;
(d) said shorting plunger and rod extending vertically through an aperture in said lower seal plate and centrally into said section in vertically translatable vacuum-sealed relation therewith.

10. A high-speed cavity tuning apparatus in accordance with claim 9 wherein said horizontally movable section suspension means further comprises a horizontal platform secured to the upper of said frame support means, a first wheeled truck disposed upon said platform and adapted to reciprocate a predetermined distance upon said platform, a second wheeled truck disposed upon said first wheeled truck and adapted to reciprocate a predetermined distance thereon in a direction perpendicular to the direction of movement of said first truck, a bracket secured to said upper seal plate, said second truck being adapted to receive said bracket and suspend said waveguide section upon said trucks, and said horizontally movable support means further comprises a support plate, a brace for rigidly securing said support plate a selected distance above said base plate, a plurality of spring centering means having spring-loaded plungers secured to said support plate and about the periphery of said lower seal plate, said spring-loaded plungers thereof bearing radially inward upon the periphery of said lower seal plate, and a plurality of springs disposed between said support plate against the lower end of the waveguide section upon suspension of said section upon said suspension means.

11. A high-speed cavity tuning apparatus in accordance with claim 3 said assembly positioning means further comprising,
(a) initial assembly position control means including a toothed rack vertically secured to one side member of said frame supports means, a toothed pinion gear rotatably secured to said indenting assembly means in meshing relation along said rack, electrical circuit means including a variable resistance circuit coupled to said pinion gear whereby rotation of said gear against said rack varies in proportion said variable resistance of said electrical circuit means establishing the position of said indenting assembly means with respect to said frame support means;
(b) and precise position control and lock means including an air cylinder having a movable plunger secured to said indenting assembly means, an air pressure source coupled to said air cylinder, said air cylinder being selectively actuated to drive said plunger thereof into engagement with one of the spaced plurality of holes in said index bar corresponding to a predetermined cavity upon initial positioning of said indenting assembly means by said initial position control means.

12. A high-speed cavity tuning apparatus in accordance with claim 11 wherein said electrical circuit means further comprises a "slave" potentiometer having a slider contact, a "control" potentiometer having a slider contact electrically connected to said "slave" potentiometer slider contact, said potentiometers being connected in electrical parallel to a source of direct current, said "slave" potentiometer slider contact being mechanically couped to said pinion gear, a sensitive polarized relay electrically connected between said slider contacts, drive relay means electrically connected between said polarized relay and said assembly drive means and adapted to selectively actuate said assembly drive means in a direction commensurate to the signal polarity sensed by said polarized relay, a series of spaced pins secured along the length of said indexing bar and protruding therefrom, switch means secured to said indenting assembly means and actuated by said spaced series of pins upon translation of said indenting assembly means, shunt relay means electrically connected to said switch means and adapted to electrically shunt said drive relay means when actuated by a pin of said series of pins corresponding to a predetermined cavity, whereby said assembly drive means is deactivated and said indenting assembly means is stopped in predetermined relation to a cavity of said waveguide section.

No references cited.

HERMAN KARL SAALBACH, *Primary Examiner.*

L. ALLAHUT, *Assistant Examiner.*